(12) United States Patent
Osburn, III et al.

(10) Patent No.: US 7,673,337 B1
(45) Date of Patent: *Mar. 2, 2010

(54) SYSTEM FOR SECURE ONLINE CONFIGURATION AND COMMUNICATION

(75) Inventors: Douglas C. Osburn, III, Houston, TX (US); John D. Cannoy, Long Beach, MS (US)

(73) Assignee: DJ Inventions, LLC, Houston, TX (US)

( * ) Notice: Subject to any disclaimer, the term of this patent is extended or adjusted under 35 U.S.C. 154(b) by 325 days.

This patent is subject to a terminal disclaimer.

(21) Appl. No.: 11/829,051

(22) Filed: Jul. 26, 2007

(51) Int. Cl.
*G06F 9/00* (2006.01)
*G06F 15/16* (2006.01)
*G06F 17/00* (2006.01)

(52) U.S. Cl. .............. 726/12; 380/282; 726/1; 726/4; 713/153

(58) Field of Classification Search .............. 380/282; 726/1, 4, 5, 12; 713/153
See application file for complete search history.

(56) References Cited

U.S. PATENT DOCUMENTS

| | | | |
|---|---|---|---|
| 5,719,771 A | 2/1998 | Buck et al. | |
| 5,926,745 A * | 7/1999 | Threadgill et al. | 455/12.1 |
| 6,058,307 A * | 5/2000 | Garner | 455/428 |
| 6,243,580 B1 * | 6/2001 | Garner | 455/428 |
| 6,658,349 B2 | 12/2003 | Cline | |
| 6,751,562 B1 * | 6/2004 | Blackett et al. | 702/61 |
| 6,788,980 B1 * | 9/2004 | Johnson | 700/1 |
| 6,792,337 B2 * | 9/2004 | Blackett et al. | 700/295 |
| 6,944,555 B2 * | 9/2005 | Blackett et al. | 702/62 |
| 6,963,817 B2 * | 11/2005 | Ito et al. | 702/138 |
| 6,985,831 B2 * | 1/2006 | Ito et al. | 702/188 |
| 6,990,527 B2 * | 1/2006 | Spicer et al. | 709/229 |
| 7,007,093 B2 * | 2/2006 | Spicer et al. | 709/229 |
| 7,020,532 B2 * | 3/2006 | Johnson et al. | 700/89 |
| 7,066,010 B2 * | 6/2006 | Bryant et al. | 73/40.5 R |
| 7,085,824 B2 * | 8/2006 | Forth et al. | 709/221 |
| 7,127,328 B2 * | 10/2006 | Ransom | 700/286 |
| 7,167,081 B2 * | 1/2007 | Strumpf et al. | 340/310.13 |
| 7,188,003 B2 * | 3/2007 | Ransom et al. | 700/286 |
| 7,216,043 B2 * | 5/2007 | Ransom et al. | 702/62 |
| 7,228,129 B1 * | 6/2007 | Ward et al. | 455/423 |
| 7,248,978 B2 * | 7/2007 | Ransom | 702/62 |
| 7,263,459 B2 * | 8/2007 | Ito et al. | 702/138 |
| 7,286,914 B2 | 10/2007 | Cerchione et al. | |
| 7,350,070 B2 * | 3/2008 | Smathers et al. | 713/150 |
| 7,415,368 B2 * | 8/2008 | Gilbert et al. | 702/61 |
| 7,447,760 B2 * | 11/2008 | Forth et al. | 709/223 |
| 7,453,267 B2 * | 11/2008 | Westbrock et al. | 324/522 |
| 7,467,018 B1 * | 12/2008 | Callaghan | 700/1 |
| 7,532,640 B2 * | 5/2009 | Kelly et al. | 370/466 |

(Continued)

*Primary Examiner*—David García Cervetti
(74) *Attorney, Agent, or Firm*—Buskop Law Group, PC; Wendy Buskop

(57) ABSTRACT

A system for online configuration and communication for a supervisory control and data acquisition system comprising an online configurable enterprise server, at least one intelligent electronic device, an online configurable intelligent electronic cryptographic module, and a configurable server interface. Both the online configurable enterprise server and the online configurable intelligent electronic cryptographic module include respective cryptography chips and computer instructions for instructing respective processors to selectively encrypt and decrypt commands, messages, data, and responses, allowing non-encrypted transmissions between the at least one intelligent electronic device and the online configurable intelligent electronic cryptographic module, and selectively encrypted transmission between the intelligent electronic cryptographic module and the online configurable enterprise server.

18 Claims, 3 Drawing Sheets

U.S. PATENT DOCUMENTS

| | | | |
|---|---|---|---|
| 7,587,481 B1 * | 9/2009 | Osburn, III | 709/223 |
| 2002/0158776 A1 | 10/2002 | Lash et al. | |
| 2003/0154056 A1 * | 8/2003 | Ito et al. | 702/188 |
| 2003/0204756 A1 * | 10/2003 | Ransom et al. | 713/300 |
| 2004/0098218 A1 * | 5/2004 | Ito et al. | 702/138 |
| 2004/0138786 A1 * | 7/2004 | Blackett et al. | 700/295 |
| 2004/0138834 A1 * | 7/2004 | Blackett et al. | 702/62 |
| 2004/0193329 A1 * | 9/2004 | Ransom et al. | 700/286 |
| 2004/0217900 A1 | 11/2004 | Martin et al. | |
| 2004/0264402 A9 * | 12/2004 | Whitmore et al. | 370/328 |
| 2005/0005093 A1 * | 1/2005 | Bartels et al. | 713/150 |
| 2005/0039040 A1 * | 2/2005 | Ransom et al. | 713/200 |
| 2005/0122250 A1 | 6/2005 | Taylor | |
| 2005/0131583 A1 * | 6/2005 | Ransom | 700/295 |
| 2005/0138120 A1 | 6/2005 | Gundersen et al. | |
| 2005/0138432 A1 * | 6/2005 | Ransom et al. | 713/201 |
| 2005/0144437 A1 * | 6/2005 | Ransom et al. | 713/151 |
| 2005/0185787 A1 * | 8/2005 | Kow | 379/355.04 |
| 2005/0226419 A1 * | 10/2005 | Smathers et al. | 380/259 |
| 2006/0023676 A1 * | 2/2006 | Whitmore et al. | 370/338 |
| 2006/0052985 A1 * | 3/2006 | Ito et al. | 702/188 |
| 2006/0067209 A1 * | 3/2006 | Sheehan et al. | 370/216 |
| 2006/0191457 A1 | 8/2006 | Murphy | |
| 2006/0203804 A1 * | 9/2006 | Whitmore et al. | 370/352 |
| 2006/0238932 A1 * | 10/2006 | Westbrock et al. | 361/42 |
| 2006/0270383 A1 * | 11/2006 | Yergens et al. | 455/404.1 |
| 2007/0078839 A1 * | 4/2007 | Teodoro et al. | 707/4 |
| 2007/0199061 A1 * | 8/2007 | Byres et al. | 726/11 |
| 2007/0202859 A1 * | 8/2007 | Ward | 455/414.1 |
| 2008/0065449 A1 * | 3/2008 | Blagg et al. | 705/8 |
| 2008/0101251 A1 * | 5/2008 | Casebolt et al. | 370/252 |
| 2009/0002150 A1 * | 1/2009 | Zilberstein et al. | 340/531 |
| 2009/0106551 A1 * | 4/2009 | Boren et al. | 713/158 |
| 2009/0132299 A1 * | 5/2009 | Patton | 705/4 |
| 2009/0212226 A1 | 8/2009 | Britton, Jr. et al. | |

* cited by examiner

SYSTEM FOR SECURE ONLINE CONFIGURATION AND COMMUNICATION

FIELD

The present embodiments relate to a system for secure online configuration and communication between an online configurable enterprise server and at least one intelligent electronic device using an online configurable intelligent electronic cryptographic module.

BACKGROUND

A need exists for a system for secure and online configuration and communication able to selectively encrypt, decrypt, and securely transmit messages, commands, data, and responses between an enterprise server and one or more intelligent electronic devices.

A further need exists for system capable of mixed-mode transmission, selectively encrypting specified messages or messages from a specified source, while omitting encryption of one or more other messages.

A need exists for a system for secure and online configuration and communication that can be configured to perform differing mixed-mode transmissions on-line, without interrupting the normal functions of the enterprise server, the intelligent electronic cryptographic module, or any of the intelligent electronic devices in communication with the module.

A need also exists for system that is able to securely reconfigure one or more intelligent electronic devices, enterprise servers, or intelligent electronic cryptographic modules on-line, without interrupting the normal functions of the enterprise server, the intelligent electronic cryptographic module, or any of the intelligent electronic devices in communication with the module.

The present embodiments meet these needs.

BRIEF DESCRIPTION OF THE DRAWINGS

The detailed description will be better understood in conjunction with the accompanying drawings as follows.

Figure 1:
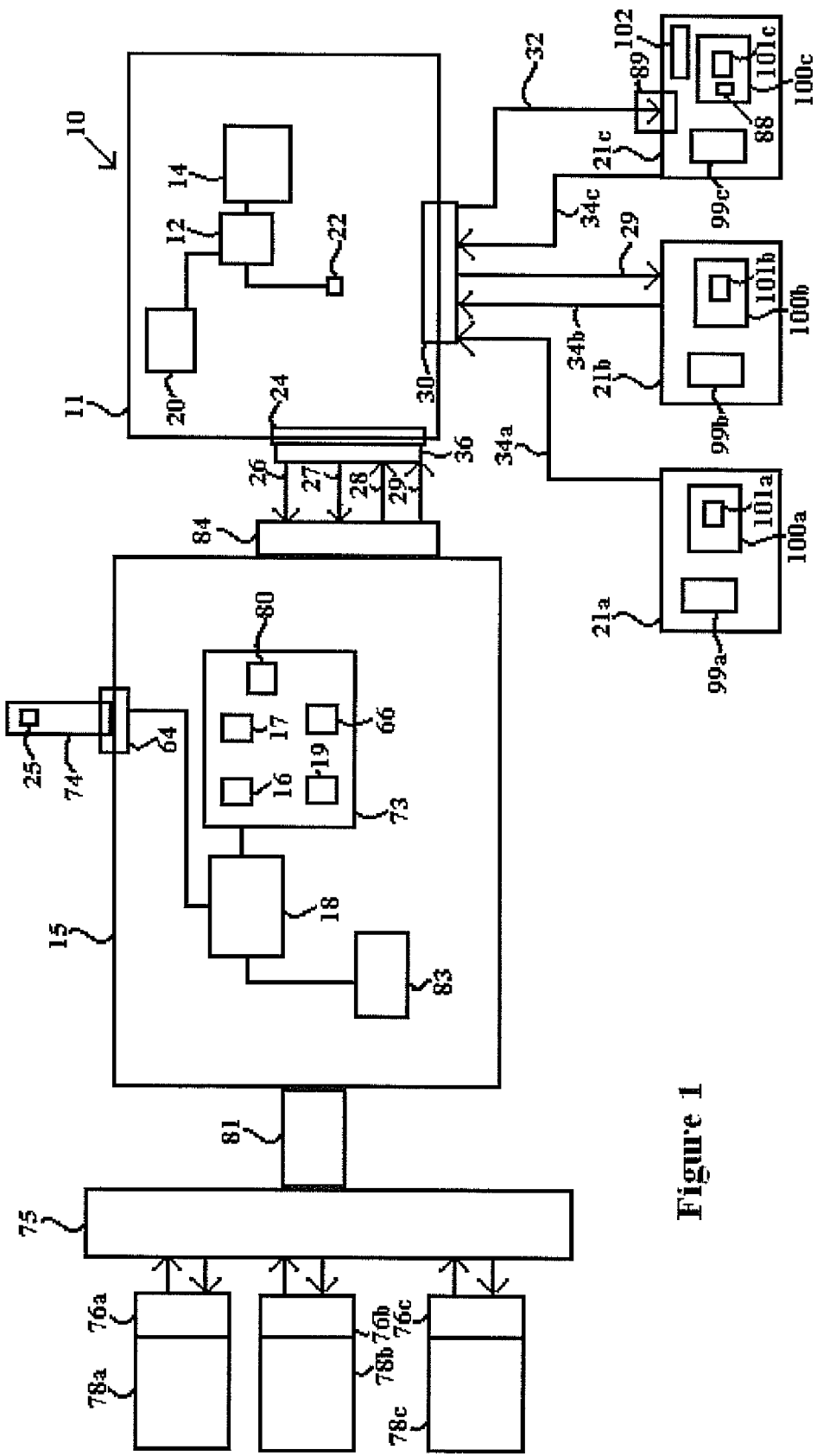
FIG. 1 depicts a diagram of the present system.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that they can be practiced or carried out in various ways.

The present system provides enhanced security during communication between an online configurable enterprise server and one or more intelligent electronic devices via an online configurable intelligent electronic cryptographic module.

The online configurable intelligent electronic cryptographic module can provide secure communication between an online configurable enterprise server and various kinds of intelligent electronic devices, including remote terminal units, programmable logic controllers, and other similar intelligent electronic devices.

The online configurable intelligent electronic cryptographic module can include software enabling the online configurable intelligent electronic cryptographic module to both function as an online configurable remote terminal unit for performing a variety of processes, and to function as an online configurable intelligent electronic cryptographic module, selectively encrypting and decrypting messages and responses between an online configurable enterprise server and one or more intelligent electronic devices.

The encryption provided by the present system is more efficient than conventional encryption means due to the present system's ability to enable on-line, real time reconfiguration of the enterprise server, the intelligent electronic cryptographic module, and one or more intelligent electronic devices. Through this on-line reconfiguration, the online configurable intelligent electronic cryptographic module, one or more intelligent electronic devices, or the enterprise server can be reconfigured without interrupting service to any of the intelligent electronic devices, or interrupting the functions of the intelligent electronic devices or the intelligent electronic cryptographic module, thereby maintaining continuity of service and saving costs and hindrances associated with deactivating modules and units.

Even "Legacy Remote Terminal Units" which lack the hardware or software to be reconfigured on-line can be selectively reconfigured without affecting the function of any other intelligent electronic devices, the online configurable enterprise server, or the online configurable intelligent electronic cryptographic module. Additionally, data, messages, and responses from legacy remote terminal units can be selectively encrypted and decrypted using the online configurable intelligent electronic cryptographic module.

The present system further allows for efficient security by utilizing pass-through transmission of messages, responses, commands, and data, independent of any associated gateway protocols. The present system allows for use of mixed-mode transmission, selectively encrypting only specified messages, or messages from a specified source, saving time, costs, and bandwidth, while permitting other data to pass through the online configurable intelligent electronic cryptographic module for encryption or decryption. The specifications relating to the mixed-mode transmission can be reconfigured on-line, in real time, without interrupting the functions of the system components.

The pass-through capabilities of the present system allow the connectivity and security between an online configurable enterprise server, the online configurable intelligent electronic cryptographic module, and one or more intelligent electronic devices to be efficiently and effectively tested prior to encrypting transmissions, and at any time during service.

The present system also provides enhanced security through use of authentication means, such as digital certificates and keys, and tamper proof encryption through use of a cryptography chip. The embodied cryptography chip can be built into the online configurable intelligent electronic cryptographic module or separately attached using a removable data storage media. A cryptography chip can also be attached to the online configurable enterprise server using a removable data storage device. The cryptography chip is compatible with the Windows CE Operating System, Windows XP, Windows 2003, and other similar operating systems, and can be utilized through a standard cryptographic application programming interface (CAPI™).

The authentication means provided through use of the cryptography chips within the online configurable enterprise server and the online configurable intelligent electronic cryptographic module provide greater security than conventional means, which typically do not include authentication of system components. The authentication of the online configurable server, the online configurable intelligent electronic cryptographic module, and one or more intelligent electronic devices can be selectively performed as frequently as needed to maintain security, or as infrequently as needed to conserve costs and bandwidth.

The present embodiments relate to a system for configuration and communication for a supervisory control and data acquisition system.

The system includes an online configurable enterprise server. The online configurable enterprise server has a server port, such as a universal serial bus port, for receiving a server removable data storage device having a server cryptography chip. The server cryptography chip can be a Spyrus Rosetta, or a Spyrus Lynks, made by Spyrus of San Jose, Calif.

The online configurable enterprise server can also include a server power supply, which can include alternating current sources, direct current sources, renewable power sources, rechargeable power sources, replaceable power sources, and combinations thereof. The online configurable enterprise server can further include a server telemetry interface, such as a modem, radio, satellite, or Ethernet interface.

The online configurable enterprise server has a server processor in communication with a server data storage. The server data storage can include a server protocol module, such as a BSAP, a MODBUS, or similar protocol modules, a server connection module, such as a serial module, a dial-up module, or a TCP/IP module, and a server configuration database, such as an Oracle or Microsoft Access database, for restoring online configurations of the enterprise server when the server is reset. The server data storage can also include a server authentication module, however it is contemplated that the server authentication module can be contained in memory within the server cryptography chip.

In an embodiment, the server data storage can also include a configuration software, such as Autosol RTU Maintenance Environment (ARME) made by Automated Solutions of Houston, Tex., for enabling the online reconfiguration of one or more intelligent electronic devices in communication with the online configurable enterprise server.

The system can include at least one intelligent electronic device for measuring a process, such as metering a utility, detecting abnormal operating conditions, performing data processing, controlling operating conditions, and combinations thereof. Possible intelligent electronic devices can include remote terminal units, such as an Autosol RTU 4000, a Bristol Babcock 3330 RTU, an Emerson ROC 809, or similar remote terminal units. Possible intelligent electronic devices can also include a programmable logic controller (PLC) or other similar intelligent electronic devices.

It is contemplated that any number of intelligent electronic devices can be in communication with the online configurable enterprise server.

Each intelligent electronic device is contemplated to include an IED processor and IED data storage having computer instructions for instructing the IED processor to transmit non-encrypted measured data to the online configurable enterprise server.

In an embodiment, one or more intelligent electronic devices can have analog-to-digital converters in communication with the IED processor for measuring processes and converting non-encrypted measurements into digital representations. The digital representations can be selectively stored in IED data storage.

Each intelligent electronic device can include IED computer instructions for instructing the IED processor to selectively store the digital representations, and a bidirectional IED port for transmitting the digital representations to the online configurable enterprise server. The bidirectional IED port can also be used for receiving commands from the online configurable enterpriser server in response to the digital representations.

It is further contemplated that the IED data storage can include computer instructions for instructing the IED processor to perform autonomously in the absence of instruction from the enterprise server.

The present system also includes an online configurable intelligent electronic cryptographic module in communication with the online configurable enterprise server. In an embodiment, the online configurable intelligent electronic cryptographic module can be adapted to be activated, to perform encryption and decryption functions, and deactivated, to allow messages and responses to pass through without encryption or decryption, on-line, without interruption of service to the online configurable enterprise server or any of the intelligent electronic devices.

The online configurable intelligent electronic cryptographic module includes a first cryptography chip and at least one data storage media, which can include removable memory, non-removable memory, flash memory, or combinations thereof.

The first cryptography chip is contemplated to be substantially similar to the server cryptography chip. Both the first cryptography chip in the online configurable intelligent electronic cryptographic module and the server cryptography chip can include cryptographic tamper resistant memory, which can contain one or more encryption and decryption algorithms, one or more keys, a random number generator, at least one certificate for digital signatures, an authentication module, and combinations thereof.

In an embodiment, the first cryptography chip can be disposed within a first removable data storage device, which can be in communication with the first processor through a port, such as a universal serial bus port. This embodiment can advantageously allow the cryptography chip to be utilized in after-market applications.

It is contemplated that the encryption and decryption functions of first cryptography chip, the server cryptography chip, or combinations thereof can be selectively activated and deactivated, enabling mixed-mode transmissions.

For example, non-encrypted measured data from a low security intelligent electronic device can be permitted to pass through the online configurable intelligent electronic cryptographic module without encryption, to conserve bandwidth, time, and resources, and the non-encrypted measured data can be transmitted to the online configurable enterprise server.

Simultaneously or independently, non-encrypted measured data, such as alarm thresholds, control targets, or calculated values, from a high security intelligent electronic device can be encrypted prior to transmitting any data from the high security intelligent electronic device to the online configurable enterprise server.

Additionally, selective pieces of non-encrypted measured data from any intelligent electronic device can be selectively encrypted, or remain non-encrypted, depending on the nature of the measured data or any other factors, such as date, time of day, a need to conserve time or bandwidth, or similar factors.

The data storage within the online configurable intelligent electronic cryptographic module can include computer instructions for instructing a first processor within the online configurable intelligent electronic cryptographic module to selectively decrypt messages from the online configurable enterprise server using the first cryptography chip and transmit decrypted messages to one or more intelligent electronic devices.

The data storage can further include computer instructions for instructing the first processor to select at least one protocol module, such as BSAP, MODBUS, ROC, DNP 3.0, or other similar protocol modules, for communication with one or more intelligent electronic devices, the online configurable enterprise server, or combinations thereof. The computer instructions can also instruct the first processor to select at least one appropriate telemetry method, such as a modem, a radio, an Ethernet, a satellite, or other similar telemetry methods, for transmitting and receiving messages using the one or more selected protocol modules. The use of a telemetry method can be facilitated through use of one or more connection modules.

The data storage can also include computer instructions for instructing the first processor to perform as a soft remote terminal unit, as described in U.S. Pat. No. 6,628,992.

It is contemplated that when the online configurable intelligent electronic cryptographic module performs as a remote terminal unit, in addition to performing intelligent encryption and decryption functions, the use of additional intelligent electronic devices in communication with the intelligent electronic cryptographic module can be omitted, and the intelligent electronic cryptographic module can both function as a cryptographic module and as a remote terminal unit simultaneously.

When the online configurable intelligent electronic cryptographic module functions as a remote terminal unit, the module advantageously becomes both an intelligent cryptographic module and an online configurable remote terminal unit. This is a noteworthy advantage over conventional "Legacy Remote Terminal Units," which typically lack hardware or software to permit online configurability or encrypted transmissions. Use of the online configurable intelligent electronic cryptographic module as a remote terminal unit also provides enhanced security by eliminating the clear-text link between the online configurable intelligent electronic cryptographic module and a Legacy Remote Terminal Unit.

It is further contemplated, however, that any number of additional remote terminal units or other intelligent electronic devices can be in communication with the online configurable intelligent electronic cryptographic module, independent of the online configurability of any of the intelligent electronic devices, and independent of whether the online configurable intelligent electronic cryptographic module is also functioning as a soft remote terminal unit.

The first processor, disposed within the online configurable intelligent electronic cryptographic module, is adapted to authenticate the online configurable enterprise server, the online configurable intelligent electronic cryptographic module, any of the intelligent electronic devices, or combinations thereof. The first processor is also adapted to provide encrypted and non-encrypted communication with the online configurable enterprise server and non-encrypted communication with one or more of the intelligent electronic devices.

The data storage can further include computer instructions for instructing the first processor to selectively encrypt non-encrypted measured data transmitted by one or more intelligent electronic devices and transmit encrypted measured data to the online configurable enterprise server.

The data storage can also include computer instructions for instructing the first processor to authenticate, at least once, that the online configurable enterprise server is authorized to transmit to the online configurable intelligent electronic cryptographic module, and that online configurable intelligent electronic cryptographic module is authorized to transmit to the online configurable enterprise server. This provides an additional level of security over conventional means, which typically lack authentication. The authentication of the online configurable enterprise server and the online configurable intelligent electronic cryptographic module can be performed as frequently as necessary to ensure security, or as infrequently as necessary to conserve costs and bandwidth.

The data storage additionally includes computer instructions for instructing the first processor to communicate a command from the online configurable enterprise server to one or more intelligent electronic devices. The command can include reconfiguration instructions for one or more intelligent electronic devices, a request for data, or combinations thereof.

Computer instructions for instructing the first processor to communicate a command from one or more intelligent electronic devices to the online configurable enterprise server can also be resident in the data storage. The command can include non-encrypted measured data, a request for further instructions, or combinations thereof.

The computer instructions can further instruct the first processor to store encrypted measured data in the data storage.

In a contemplated embodiment, the online configurable intelligent electronic cryptographic module can further include computer instructions for instructing the first processor to embed a first digital signature in the online configurable enterprise server, embed a second digital signature in the online configurable intelligent online cryptographic module, and validate the digital signatures prior to encrypting, decrypting, and transmitting messages and responses.

It is also contemplated that the server data storage can include computer instructions for instructing the server processor to derive one or more public and/or private exchange keys and transmit the public exchange key to the online configurable intelligent electronic cryptographic module. The public key can be used to encrypt session keys, while the private keys are required to decrypt session keys.

The data storage in the online configurable intelligent electronic cryptographic module can include computer instructions for instructing the processor to receive the public exchange key, derive at least one session key, and encrypt the session key using the public key. The encrypted session key can then be transmitted to the online configurable enterprise server, where it can be decrypted using the server private key. The online configurable intelligent electronic cryptographic module can also derive a private key, useable to decrypt an encrypted session key transmitted by the online configurable enterprise server. It is contemplated that the session key can then be used to encrypt messages and responses transmitted between the online configurable enterprise server and the online configurable intelligent electronic cryptographic module.

The online configurable intelligent electronic cryptographic module can also include one or more server-side ports, such as an interface for a radio, a modem, an Ethernet, a satellite, or similar interfaces, for receiving encrypted and non-encrypted messages from the online configurable enterprise server and transmitting encrypted or non-encrypted responses to the online configurable enterprise server.

The online configurable intelligent electronic cryptographic module can further include one or more non-encrypted ports, such as a RS232, KB9, or RS45 terminal, for transmitting decrypted or non-encrypted messages to one or more intelligent electronic devices and receiving non-encrypted responses from the intelligent electronic devices.

It is contemplated that the one or more server-side ports, non-encrypted ports, or combinations thereof can be an interface adapted for engaging a serial port, a cellular modem, a standard modem, a wireline modem, a satellite network, a Transfer Connection Protocol/Internet Protocol, an Ethernet, a radio network, a fiber-optic network, or combinations thereof.

The data storage of the online configurable intelligent electronic cryptographic module can include a log for storing information, such as configuration changes, communication statistics, and data from one or more intelligent electronic devices, the online configurable enterprise server, from the online configurable intelligent electronic cryptographic module.

In a contemplated embodiment, the online configurable intelligent electronic cryptographic module can include a telemetry interface, such as an interface for a modem, radio, Ethernet, or satellite, in communication with the first processor and the online configurable enterprise server.

In an embodiment, the online configurable intelligent electronic cryptographic module can also include a means for wirelessly transmitting messages and responses between the intelligent electronic devices and the online configurable enterprise server. Wireless transmission means can include spreadspectrum radios, multipoint radios, satellite transmission means, cellular transmission means, and other similar means.

The present system can also include a configurable server interface, which can include a server application programming interface, such as OLE for Process Control (OPC), in communication between one or more client devices having client interfaces, and the online configurable enterprise server.

In a contemplated embodiment, the present system can include one or more additional enterprise servers in communication with the intelligent electronic devices. Additional enterprise servers can be used to provide online configurability and communication when the primary online configurable enterprise server is damaged or reaches capacity. For example, if an enterprise server in California is damaged by an earthquake, a second enterprise server in New York, remote from the disaster site, can seamlessly resume the functions of the damaged enterprise server without interruption of service or functionality. Additional enterprise servers can also be used to independently and simultaneously provide online configurability and communication with the same or different online configurable intelligent electronic cryptographic modules and intelligent electronic devices as the primary online configurable enterprise server.

Each of the intelligent electronic devices, the online configurable enterprise server, the online configurable intelligent electronic cryptographic module, or combinations thereof, can be in communication via a network, such as the internet, a local area network, a wide area network, a fiber-optic network, a satellite network, a cellular network, a virtual private network, or other similar networks.

It is further contemplated that each of the intelligent electronic devices, the online configurable enterprise server, the online configurable intelligent electronic cryptographic module, or combinations thereof, can be in simultaneous communication via multiple networks.

In an embodiment, the online configurable enterprise server can be in communication with a first network, a first intelligent electronic device can be in communication with a second network, and a second intelligent electronic device can be in communication with a third network, and all three components can communicate via their respective networks.

It is contemplated that the online configurable enterprise server, the online configurable intelligent electronic cryptographic module, one or more of the intelligent electronic devices, or combinations thereof, can be adapted to engage at least two industry standard protocols simultaneously.

The industry standard protocols can include a MODBUS, a DNP3.0, a BSAP™, a Megaco/H.248 protocol, simple message transfer protocol (SMTP), a short message service (SMS) protocol, a multimedia message service (MMS) protocol, an enhanced message service (EMS) protocol, a media gateway control protocol (MGCP), a SIP protocol, a H.323 protocol, an ISDN protocol, a PSTN protocol, and combinations thereof.

Referring now to FIG. 1, a diagram depicting an embodiment of the present system is shown.

Intelligent electronic cryptographic module 10 is shown having secure enclosure 11, which can be any kind of durable housing, including tamper-proof and weather resistant enclosures. Intelligent electronic cryptographic module 10 is depicted having a first processor 12 in communication with a first data storage 14. First processor 12 is also in communication with a first cryptography chip 22.

A power supply 20, is also depicted within intelligent electronic cryptographic module 10 in communication with first processor 12 for supplying power to first processor 12 and other components of intelligent electronic cryptographic module 10.

Intelligent electronic cryptographic module 10 is shown having a server-side port 24 for receiving encrypted message 28 and non-encrypted message 29, and for transmitting encrypted response 26 and non-encrypted response 27 to an enterprise server 15 via telemetry interface 36 and server telemetry interface 84. While only one server-side port 24 is depicted, intelligent electronic cryptographic module 10 can have any number of server-side ports, including separate ports for encrypted communication, non-encrypted communication, and mixed-mode communication.

Intelligent electronic cryptographic module 10 is also depicted having a non-encrypted port 30 for receiving first non-encrypted response 34a from first remote terminal unit 21a, second non-encrypted response 34b from second remote terminal unit 21b, and third non-encrypted response 34c, from third remote terminal unit 21c. While intelligent electronic cryptographic module 10 is depicted in communication with three remote terminal units, it is contemplated that intelligent electronic cryptographic module 10 can be in communication with any type and any number of intelligent electronic devices.

It is contemplated that first processor 12 can use first cryptography chip 22 to selectively encrypt first non-encrypted response 34a, second non-encrypted response 34b, and third non-encrypted response 34c prior to transmitting each response to enterprise server 15. It is contemplated that non-encrypted responses can also be transmitted to enterprise server 15, such as when a low priority remote terminal unit does not require secure encryption.

Non-encrypted port 30 is also shown transmitting non-encrypted message 29 to second remote terminal unit 21b and a decrypted message 32 to a third remote terminal unit 21c.

First remote terminal unit 21a is shown having first RTU processor 99a and first RTU data storage 100a. First RTU data storage has computer instructions 101a for instructing first RTU processor 99a to transmit data to enterprise server 15 via intelligent electronic cryptographic module 10.

Second remote terminal unit 21b is shown having second RTU processor 99b and second RTU data storage 100b. Second RTU data storage has computer instructions 101b for instructing second RTU processor 99b to transmit data to enterprise server 15 via intelligent electronic cryptographic module 10.

Third remote terminal unit 21c is shown having third RTU processor 99c and third RTU data storage 100c. Third RTU data storage has computer instructions 101c for instructing third RTU processor 99c to transmit data to enterprise server 15 via intelligent electronic cryptographic module 10.

Third remote terminal unit 21c is depicted having an analog-to-digital converter 102 and computer instructions 88 in third RTU data storage 100c for instructing third RTU processor 99c to selectively store and transmit digital representations measured by third remote terminal unit 21c. Third remote terminal unit 21c also has a bidirectional port 89 for transmitting the digital representations to enterprise server 15 via intelligent electronic cryptographic module 10 and receiving commands and responses from enterprise server 15.

Enterprise server 15 is shown having a server processor 18 in communication with server data storage 73. Server data storage 73 is shown having a server authentication module 16, a server protocol module 17, and a server connection module 19. Server data storage 73 also includes computer instructions 66 for reconfiguring first remote terminal unit 21a, second remote terminal unit 21b, or third remote terminal unit 21c. Server data storage 73 is further depicted having server configuration database 80. Enterprise server 15 is also shown having server power supply 83 in communication with server processor 18.

Enterprise server 15 is also having a server removable data storage 74 in communication with sever processor 18 via a server port 64, such as a universal serial bus port. Server removable data storage 74 has a server cryptography chip 25, which is contemplated to be substantially similar to first cryptography chip 22. While server authentication module 16 is depicted in server data storage 73, it is also contemplated that server authentication module 16 can be contained within server removable data storage 74, or in memory within server cryptography chip 25.

A first client device 78a having first client interface 76a, a second client device 78b, having second client interface 76b, and a third client device 78c having third client interface 76c are shown in communication with enterprise server 15 via configurable server interface 75 and server application protocol interface 81. First client device 78a, second client device 78b, and third client device 78c can be used to transmit reconfiguration commands to enterprise server 15, any of first remote terminal unit 21a, second remote terminal unit 21b, or third remote terminal unit 21c, or intelligent electronic cryptographic module 10, and to receive data and responses.

First client device 78a, second client device 78b, and third client device 78c can be any type of client device, including computers, cellular telephones, personal digital assistants, enterprise data servers, and other similar devices.

Figure 2:
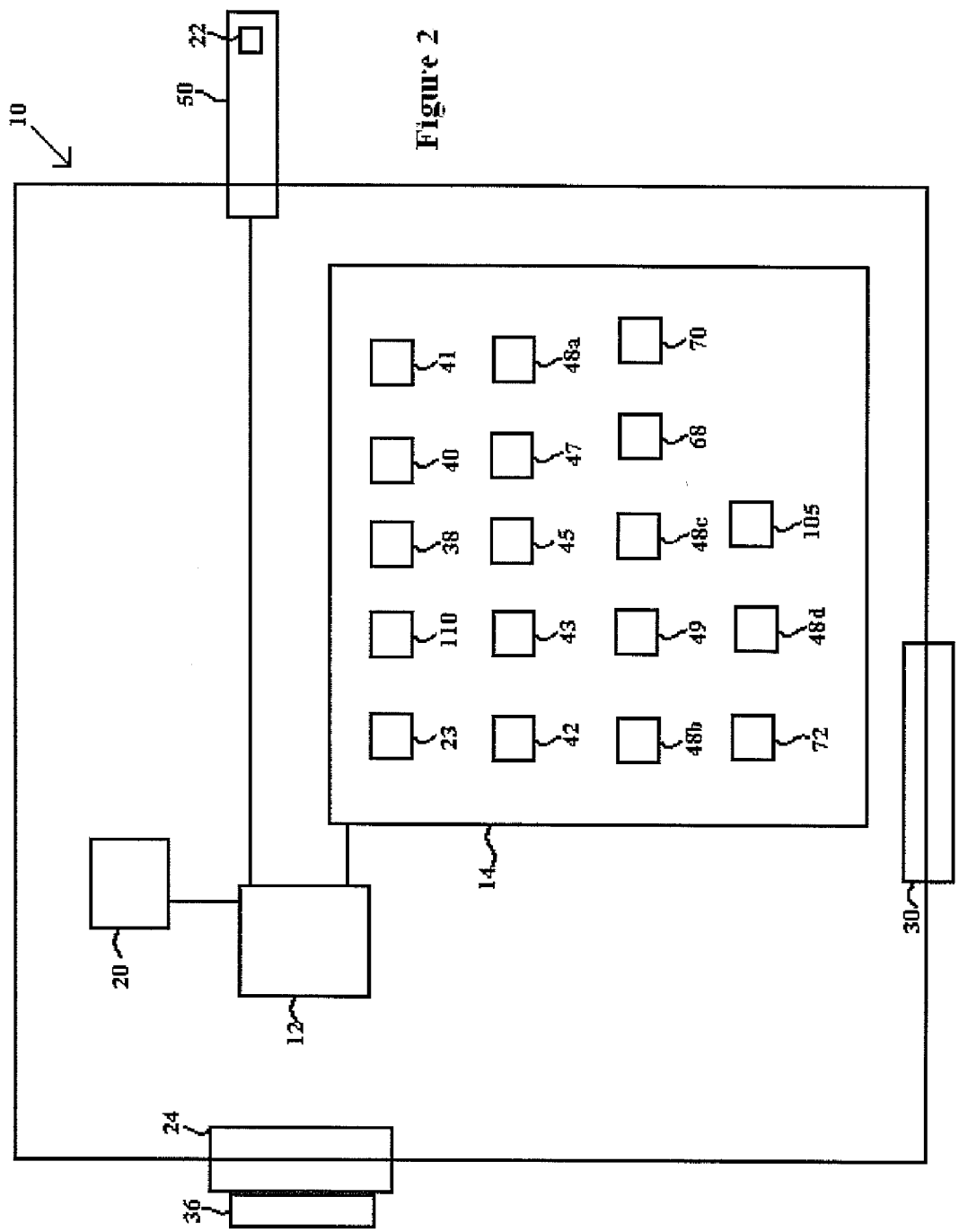
FIG. 2 depicts a diagram of an embodiment of an intelligent electronic cryptographic module useable within the present system.

Referring now to FIG. 2, a diagram of an embodiment of the intelligent electronic cryptographic module 10 is depicted.

Intelligent electronic cryptographic module 10 is shown having first processor 12 in communication with first data storage 14 and power supply 20.

Removable data storage device 50 having first cryptography chip 22 is shown in communication with intelligent electronic cryptographic module 10, such as via a universal serial bus port, such that first processor 12 can use first cryptography chip 22 to encrypt and decrypt messages and responses. It is contemplated that use of first cryptography chip 22 within removable data storage device 50 can allow modules that lack built-in cryptography capability to incorporate use of first cryptography chip 22.

Intelligent electronic cryptographic module 10 is also shown having server-side port 24, telemetry interface 36, and non-encrypted port 30.

First data storage 14 is depicted having authentication module 23 and cryptographic application programming interface (CAPI™) 110. First data storage 14 is also depicted having computer instructions 38 for instructing first processor 12 to perform as a soft remote terminal unit.

While FIG. 2 depicts authentication module 23 within first data storage 14, it is also contemplated that application module 23 can be contained within removable data storage device 50, or in memory within first cryptography chip 22.

First data storage 14 additionally has computer instructions 40 for instructing first processor 12 to select a protocol module. Protocol module 41 is depicted within first data storage 14. While a single protocol module 41 is depicted, any number of selectable protocol modules can be included within first data storage 14.

Computer instructions 42 for instructing first processor 12 to select an appropriate telemetry method using protocol module 41 are also included in first data storage 14.

First data storage 14 also includes computer instructions 43 for instructing first processor 12 to authenticate that the enterprise server is authorized to transmit to one or more remote terminal units, and computer instructions 45 for instructing first processor 12 to authenticate that one or more remote terminal units are authorized to transmit to the enterprise server.

First data storage 14 has computer instructions 47 for instructing first processor 12 to decrypt encrypted messages from the enterprise server using first cryptography chip 22, and computer instructions 49 for instructing first processor 12 to encrypt non-encrypted responses from one or more remote terminal units using first cryptography chip 22.

First data storage 14 further has computer instructions 48a for instructing first processor 12 to receive encrypted messages from the enterprise server and computer instructions 48b for instructing first processor 12 to transmit decrypted messages to one or more remote terminal units.

First data storage 14 additionally has computer instructions 48c for instructing first processor 12 to receive non-encrypted responses from remote terminal units and computer instructions 48d for instructing first processor 12 to transmit encrypted responses to the enterprise server.

Computer instructions 68 for instructing first processor 12 to embed a digital signature in the enterprise server are also depicted within first data storage 14. Computer instructions 70 for instructing first processor 12 to embed a digital signature in one or more remote terminal units are further depicted within first data storage 14. Additionally, computer instructions 72 for instructing first processor 12 to validate the digital signatures of the enterprise server and remote terminal units are also depicted.

First data storage 14 is also shown including a log 105 for storing information from intelligent electronic cryptographic module 10 relating to events in the intelligent electronic cryptographic module 10, such as configuration changes.

Figure 3:
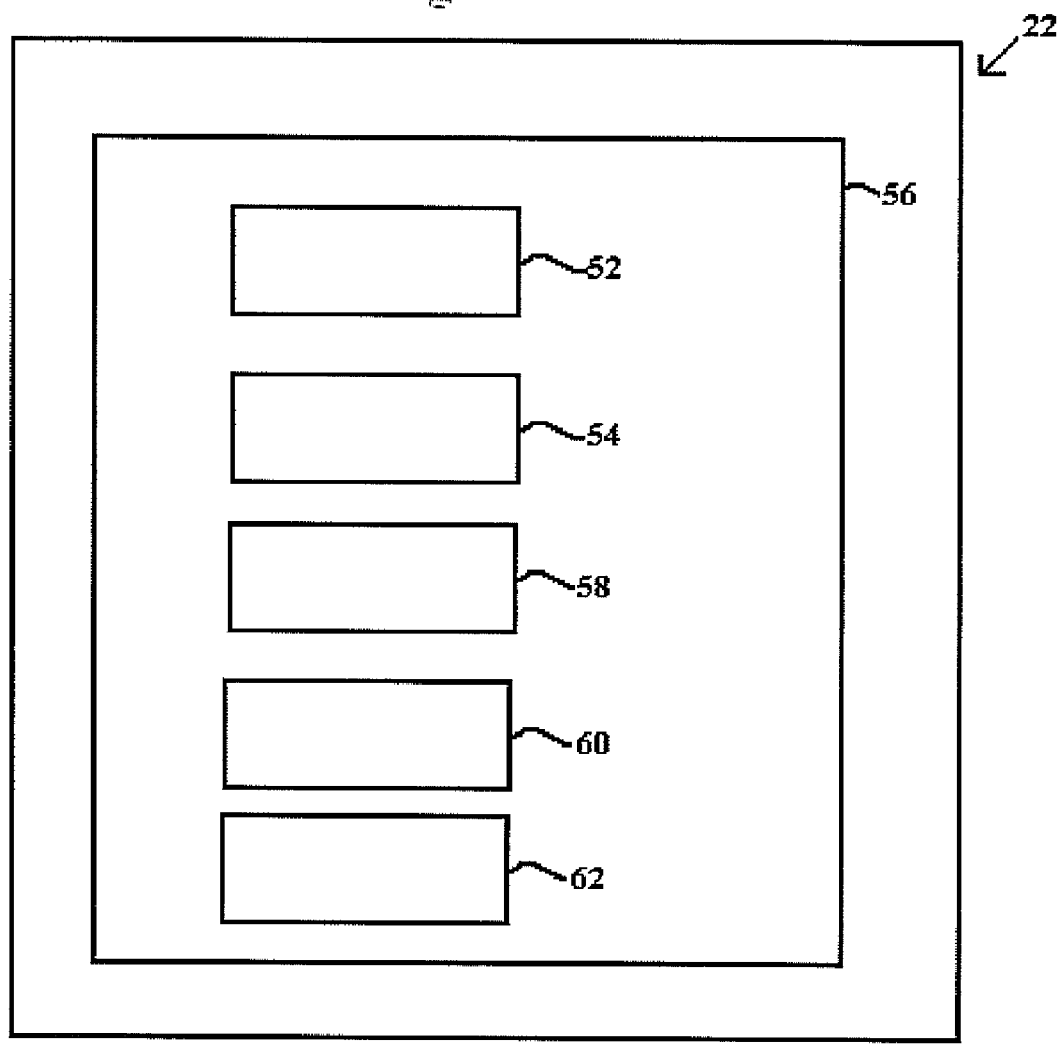
FIG. 3 depicts a diagram of an embodiment of a cryptography chip useable within the present system.

Referring now to FIG. 3, a diagram depicting an embodiment of first cryptography chip 22 is shown. It is contemplated that server cryptography chip 25 can be identical or substantially similar to first cryptography chip 22, as depicted in FIG. 3.

First cryptography chip 22 is shown having cryptographic tamper resistant memory 56, which is contemplated to be effective against both electronic and physical attempts to penetrate encryption algorithms.

Cryptographic tamper resistant memory 56 is depicted containing encryption algorithms 52, decryption algorithms 54, stored keys 58, a random number generator 60, and certificates 62 for establishing digital signatures.

First cryptography chip 22 can include any number of encryption or decryption algorithms, keys, random number generators, or digital signatures, limited only by the capacity of cryptographic tamper resistant memory 56.

While these embodiments have been described with emphasis on the embodiments, it should be understood that within the scope of the appended claims, the embodiments might be practiced other than as specifically described herein.

What is claimed is:

1. A system for online configuration and communication for a supervisory control and data acquisition system comprising:
    (a) an online configurable enterprise server comprising:
        a server port for receiving a server removable data storage device comprising a second cryptography chip;
        a server power supply;
        a server telemetry interface;
        a server processor in communication with a server data storage comprising:
            a server protocol module;
            a server connection module;
            a server configuration database;
    (b) at least one intelligent electronic device for measuring a process, wherein the at least one intelligent electronic device comprises an intelligent electronic device processor and intelligent electronic device data storage comprising computer instructions for instructing the intelligent electronic device processor to transmit non-encrypted measured data to the enterprise server;
    (c) an online configurable intelligent electronic cryptographic module in communication with the online configurable enterprise server, wherein the online configurable intelligent electronic cryptographic module comprises a first cryptography chip and at least one data storage comprising computer instructions for instructing a first processor in communication with the online configurable intelligent electronic cryptographic module to:
        i. selectively decrypt at least one encrypted message transmitted from the online configurable enterprise server using the first cryptography chip, forming at least one decrypted message;
        ii. transmit the at least one decrypted message to the at least one intelligent electronic device;
        iii. selectively encrypt the non-encrypted measured data transmitted from the at least one intelligent electronic device, forming encrypted measured data;
        iv. transmit the encrypted measured data to the online configurable enterprise server;
        v. at least once authenticate that the online configurable intelligent electronic cryptographic module is authorized to transmit to the online configurable enterprise server, and
        vi. at least once authenticate that the online configurable enterprise server is authorized to transmit to the online configurable intelligent electronic cryptographic module;
        vii. communicate a command from the online configurable enterprise server to the online configurable intelligent electronic cryptographic module, wherein the command comprises reconfiguration instructions for the at least one intelligent electronic device, a request for data from the at least one intelligent electronic device, or combinations thereof;
        viii. communicate a command from the at least one intelligent electronic device to the online configurable enterprise server, wherein the command comprises the non-encrypted measured data, a request for further instructions, or combinations thereof;
        ix. store the encrypted measured data; and
    (d) a configurable server interface comprising:
        a server application programming interface in communication between at least one configurable client device having a client interface and the online configurable enterprise server.

2. The system of claim 1, wherein the first cryptography chip, the second cryptography chip, or combinations thereof comprise at least one encryption algorithm, at least one decryption algorithm, cryptographic tamper resistant memory, at least one key resident in the cryptographic tamper resistant memory, a random number generator, at least one certificate for digital signatures, a first authentication module, or combinations thereof.

3. The system of claim 1, wherein the online configurable enterprise server further comprises a configuration software for enabling the online reconfiguration of the online configurable enterprise server, the online configurable intelligent electronic cryptographic module, the at least one intelligent electronic device, or combinations thereof.

4. The system of claim 1, wherein the online configurable intelligent electronic cryptographic module is adapted to be activated on line, without interruption of service to the at least one intelligent electronic device.

5. The system of claim 1, wherein the online configurable intelligent electronic cryptographic module further comprises computer instructions for instructing the first processor to embed a first digital signature in the online configurable enterprise server, embed a second digital signature in the online configurable intelligent electronic cryptographic module, and transmit and validate the first digital signature, the second digital signature, or combinations thereof prior to encrypting non-encrypted responses, decrypting encrypted messages, transmitting encrypted responses, or transmitting decrypted messages.

6. The system of claim 1, wherein the at least one intelligent electronic device further comprises:
    (a) an analog-to-digital converter in communication with the intelligent electronic device processor for measuring the process and converting non-encrypted measurements into digital representations, wherein the digital representations are selectively stored in the intelligent electronic device data storage;
    (b) intelligent electronic device computer instructions in the intelligent electronic device data storage for instructing the intelligent electronic device processor to selectively store the digital representations in the intelligent electronic device data storage; and
    (c) a bidirectional intelligent electronic device port for transmitting the digital representations to the online configurable enterprise server via the online configurable intelligent electronic cryptographic module and receiving commands from the online configurable enterprise server via the online configurable intelligent electronic cryptographic module in response to the digital representations.

7. The system of claim 1, wherein the online configurable intelligent electronic cryptographic module further comprises:
at least one server-side port for receiving a member of the group consisting of: at least one encrypted message, at least one non-encrypted message, or combinations thereof from the online configurable enterprise server for transmitting to at least one intelligent electronic device, and for transmitting a member of the group consisting of: at least one encrypted response, at least one non-encrypted response, or combinations thereof from the at least one intelligent electronic device to the online configurable enterprise server; and
at least one non-encrypted port for transmitting at least one decrypted message from the online configurable intelligent electronic cryptographic module to the at least one intelligent electronic device and receiving at least one non-encrypted response from the at least one intelligent electronic device for transmitting to the online configurable enterprise server.

8. The system of claim 1, wherein the at least one intelligent electronic device is adapted to perform a member of the group consisting of: metering at least one utility, detecting abnormal operating conditions, performing data processing, controlling operating conditions, and combinations thereof.

9. The system of claim 1, wherein encryption and decryption functions of the first cryptography chip, the second cryptography chip, or combinations thereof can be selectively activated and deactivated.

10. The system of claim 1, wherein the at least one data storage further comprises a log for storing information from the online configurable intelligent electronic cryptographic module.

11. The system of claim 1, further comprising at least one additional enterprise server in communication with the online configurable intelligent electronic cryptographic module for providing online configurability of and communication with the at least one additional enterprise server, the online configurable enterprise server, the online configurable intelligent electronic cryptographic module, the at least one intelligent electronic device, or combinations thereof.

12. The system of claim 1, wherein the at least one intelligent electronic device, the online configurable enterprise server, the online configurable intelligent electronic cryptographic module, or combinations thereof are in communication via at least one network.

13. The system of claim 1, wherein the online configurable enterprise server is in communication with a first network, a first intelligent electronic device is in communication with a second network, and a second intelligent electronic device is in communication with a third network.

14. The system of claim 1, wherein the online configurable enterprise server, the online configurable intelligent electronic cryptographic module, the at least one intelligent electronic device, or combinations thereof are adapted to engage at least two industry standard protocols simultaneously.

15. The system of claim 14, wherein the at least two industry standard protocols are selected from the group consisting of: a MODBUS, a DNP3.0, a BSAP™, a Megaco/H.248 protocol, simple message transfer protocol (SMTP), a short message service (SMS) protocol, a multimedia message service (MMS) protocol, an enhanced message service (EMS) protocol, a media gateway control protocol (MGCP), a SIP protocol, a H.323 protocol, an ISDN protocol, a PSTN protocol, and combinations thereof.

16. The system of claim 1, wherein the online configurable intelligent electronic cryptographic module further comprises computer instructions for instructing the first processor to:
receive at least one public exchange key from the online configurable enterprise server;
derive at least one session key;
encrypt the at least one session key using the at least one public key, forming at least one encrypted session key;
transmit the at least one encrypted session key to the online configurable enterprise server; and
wherein the online configurable enterprise server further comprises computer instructions for instructing the server processor to:
derive the at least one public exchange key and at least one private exchange key;
transmit the at least one public exchange key to the online configurable intelligent electronic cryptographic module;
receive the at least one encrypted session key from the online configurable intelligent electronic cryptographic module;
decrypt the at least one session key using the at least one private key;
wherein the at least one session key is used to encrypt messages and responses transmitted between the online configurable enterprise server and the online configurable intelligent electronic cryptographic module.

17. The system of claim 1, wherein the online configurable enterprise server further comprises computer instructions for instructing the server processor to:
receive at least one public exchange key from the online configurable intelligent electronic cryptographic module;
derive at least one session key;
encrypt the at least one session key using the at least one public key, forming at least one encrypted session key; and
transmit the at least one encrypted session key to the online configurable intelligent electronic cryptographic module; and
wherein the online configurable intelligent electronic cryptographic module further comprises computer instructions for instructing the first processor to:
derive the at least one public exchange key and at least one private exchange key;
transmit the at least one public exchange key to the online configurable enterprise server;
receive the at least one encrypted session key from the online configurable enterprise server;
decrypt the at least one session key using the at least one private key;
wherein the at least one session key is used to encrypt messages and responses transmitted between the online configurable enterprise server and the online configurable intelligent electronic cryptographic module.

18. A system for online configuration and communication for a supervisory control and data acquisition system comprising:
(a) an online configurable enterprise server comprising:
a server port for receiving a server removable data storage device comprising a second cryptography chip, wherein the second cryptography chip comprises a second authentication module;

a server power supply;

a server telemetry interface;

a server processor in communication with a server data storage comprising:

a server protocol module;

a server connection module;

a server configuration database;

(b) an online configurable intelligent electronic cryptographic module in communication with the online configurable enterprise server, wherein the online configurable intelligent electronic cryptographic module comprises a first cryptography chip and at least one data storage comprising computer instructions for instructing a first processor in communication with the online configurable intelligent electronic cryptographic module to:

i. perform as a soft remote terminal unit;

ii. selectively decrypt at least one encrypted message transmitted from the online configurable enterprise server using the first cryptography chip, forming at least one decrypted message;

iii. selectively encrypt non-encrypted measured data, forming encrypted measured data;

iv. transmit the encrypted measured data, the non-encrypted measured data, or combinations thereof to the online configurable enterprise server;

v. at least once authenticate that the online configurable intelligent electronic cryptographic module is authorized to transmit to the online configurable enterprise server, and vi. at least once authenticate that the online configurable enterprise server is authorized to transmit to the online configurable intelligent electronic cryptographic module;

vii. receive a command from the online configurable enterprise server, wherein the command comprises reconfiguration instructions for the online configurable intelligent electronic cryptographic module, a request for data from the online configurable intelligent electronic cryptographic module, or combinations thereof;

viii. communicate a response from the online configurable intelligent electronic cryptographic module to the online configurable enterprise server, wherein the response comprises the encrypted measured data, the non-encrypted measured data, a request for further instructions, or combinations thereof;

ix. store the encrypted measured data; and (c) a configurable server interface comprising:

a server application programming interface in communication between at least one configurable client device having a client interface and the online configurable enterprise server.

\* \* \* \* \*